US008480000B2

(12) United States Patent
Chen

(10) Patent No.: US 8,480,000 B2
(45) Date of Patent: Jul. 9, 2013

(54) PACKING BAG WITH RADIO FREQUENCY IDENTIFICATION FUNCTION AND MANUFACTURING METHOD THEREOF

(75) Inventor: Yung-Shun Chen, Chung Li (TW)

(73) Assignee: Taiwan Lamination Industries, Inc. (TW)

( * ) Notice: Subject to any disclaimer, the term of this patent is extended or adjusted under 35 U.S.C. 154(b) by 188 days.

(21) Appl. No.: 13/064,395

(22) Filed: Mar. 23, 2011

(65) Prior Publication Data

US 2011/0259776 A1 Oct. 27, 2011

(30) Foreign Application Priority Data

Apr. 22, 2010 (TW) ................................ 99112639 A

(51) Int. Cl.
*G06K 19/06* (2006.01)

(52) U.S. Cl.
USPC ............................ 235/492; 235/375; 235/451

(58) Field of Classification Search
USPC .......................... 235/492, 380, 487, 451, 375
See application file for complete search history.

(56) References Cited

U.S. PATENT DOCUMENTS 5,445,856 A * 8/1995 Chaloner-Gill .............. 428/35.9
2003/0052786 A1* 3/2003 Dickinson .................. 340/572.8
2007/0232164 A1* 10/2007 Swan et al. .................. 441/108
2010/0177993 A1* 7/2010 Chen ............................ 383/207
2011/0134622 A1* 6/2011 Yu et al. ........................ 361/814

FOREIGN PATENT DOCUMENTS

JP 2009289140 A * 12/2009

* cited by examiner

*Primary Examiner* — Edwyn Labaze
(74) *Attorney, Agent, or Firm* — Bacon & Thomas, PLLC

(57) ABSTRACT

The present invention is to provide a packing bag with a RFID function, which comprises a bag body, two conductive films and a RFID chip. The metal layer includes a first slot formed at a position proximate to an edge of the bag body and is used as a slot antenna. A second slot is formed between the two conductive films, and has a size capable for fixing the pins on two corresponding sides of the RFID chip onto the two conductive films respectively. The two conductive films are fixed on an external surface of an insulating layer of the bag body at a position corresponding to the first slot, such that the two conductive films can be coupled to two feed-in points of the slot antenna respectively, and the RFID chip can receive and transmit electromagnetic signals through the slot antenna (or the metal layer) accordingly.

19 Claims, 11 Drawing Sheets

PACKING BAG WITH RADIO FREQUENCY IDENTIFICATION FUNCTION AND MANUFACTURING METHOD THEREOF

FIELD OF THE INVENTION

The present invention relates to a packing bag with a RFID function, which comprises a metal layer, two conductive films and a RFID chip. The metal layer has a first slot formed at a position proximate to an edge of the packing bag and is used as a slot antenna. The two conductive films are used for increasing the coupling area of the pins on the two corresponding sides of the RFID chip, and are fixed on an external surface of an insulating layer of the packing bag at a position corresponding to the first slot, such that the two conductive films can be coupled to two feed-in points of the slot antenna respectively, and the RFID chip can receive and transmit electromagnetic signals through the slot antenna (or the metal layer) accordingly.

BACKGROUND OF THE INVENTION

Radio frequency identification (RFID) technology also known as radio frequency identification tag (RFID tag) is a communication technology for identifying a specific object through an electromagnetic signal by an identification system (such as a reader), as well as reading or writing related data in the specific object, with the advantage of having no mechanical or optical contact between the identification system and specific object at all. Compared with the barcode technology, the RFID tag can store and process a certain quantity of information, and the identification system can exchange information with a RFID tag at a certain data transmission rate through radio signals. Therefore, the RFID tag are used extensively in many areas including:

(1) Anti-counterfeit technology for banknotes and products;

(2) Identity card, pass, and ticket;

(3) Electronic fee collection system, such as Octopus of Hong Kong, and Easycard of Taiwan;

(4) Livestock or wild animal identification; and (5) Patient identity and electronic medical record.

In general, RFID tags are mainly divided into three types, respectively: passive RFID tags, semi-passive (or semi-active) RFID tags and active RFID tags, and their main properties and differences are listed as follows:

(1) Passive RFID tag: This RFID tag does not come with any internal power supply, and its internal integrated circuit is driven by a received electromagnetic wave, and the electromagnetic wave comes from a reader. If the intensity of an electromagnetic signal received by the passive RFID tag is large enough, data can be transmitted back to the reader.

(2) Semi-passive RFID Tag: This RED tag is similar to the passive RFID tag, except it has a small battery with sufficient electric power for driving the integrated circuit in the tag, setting the integrated circuit at an operating state, and improving the response speed and efficiency of the RFID tag.

(3) Active RFID Tag: Unlike the passive and semi-passive RFID tags, the active RFID tag includes an internal power supply for supplying an electric power source to the internal integrated circuit to generate an external signal. The active RFID tag generally has a longer reading distance and a larger memory capacity for storing additional information transmitted from the reader.

The RFID tag described in the present invention primarily refers to the active RFID tag, and this type of RFID tag is the mainstream product of the present RFID tag market, and has the following advantages:

(1) It provides a greater capacity for storing information;

(2) It provides a longer communication distance;

(3) It requires a higher level of difficulty for duplication;

(4) It has a larger tolerance to environmental changes; and (5) A reader can read several RFID tags simultaneously.

Due to the aforementioned advantages of the RFID tag, the RFID tag is used extensively in areas of logistics and distribution management for instant monitoring and control of details including production, transportation, allocation, and sales, so that users can control related product information (such as product type, manufacturers, dimensions, quantity, delivery destination and receiver) accurately. With reference to FIG. 1 for a conventional RFID tag 10 available in the market, the RFID tag 10 comprises a transceiver antenna 11, a chip 12 and a substrate 13, wherein the substrate 13 is usually made of a polyimide based material, and the transceiver antenna 11 is installed onto the substrate 13. In general, a copper foil is attached onto the substrate 13 first, and then the transceiver antenna 11 is formed by an etch technology according to a pre-designed antenna pattern. Both ends of the chip 12 are coupled to feed-in terminals of the transceiver antenna 11 respectively, such that the chip 12 can receive or transmit radio signals through the transceiver antenna 11.

When the RFID tag 10 is attached onto a non-conductive object (such as an object made of plastic or glass), the RFID tag 10 still can maintain its normal signal transmission effect to exchange information with a reader within a predetermined range (or distance). However, if the RFID tag 10 is attached onto a surface of a metal object and the transceiver antenna 11 transmits an electromagnetic signal, the metal object will produce an image pulse according to the image theory. The image pulse has a phase opposite to the phase of the electromagnetic signal transmitted from the transceiver antenna 11, and the image pulse and the electromagnetic signal have an offset interference, so that the electromagnetic signal will be damaged and cannot be transmitted to the reader, and the reader will be unable to read the information from the RFID tag 10 properly. The so-called offset interference refers to the condition that the peak of a wave and the trough of another wave reach a location at the same time. When the two waves are overlapped, the resultant wave has an amplitude smaller than the amplitude of the component waves. If the two waves have an opposite-phase interference, then a minimum amplitude will be produced, and such phenomenon is called a fully offset interference.

To keep a delivering item dry, avoid the item from becoming rusty or moldy, or comply with the requirement of the item that cannot be placed in direct sunlight, many existing distribution systems require users (or logistic system manufacturers) to pack the delivering item into a metal bag (such as an aluminum foil bag) for the delivery process. Since the metal bag has the advantages of a high strength, a high tenacity, and a good moisture resistance, therefore the use of metal bags becomes increasingly popular in different logistic systems. However, the aforementioned RFID tag 10 cannot be applied to metal bags due to the image pulse problem. If a user attaches the RFID tag 10 onto a metal bag, the transmission distance of the RFID tag 10 may probably drop to zero, and the reader will be unable to read the RFID tag 10, and the user will be unable to manage each delivering item accurately. Obviously, such application requires improvements.

Therefore, it is an important subject for the present invention to improve the problems of the conventional RFID tag by directly using the metal bag as an antenna of the RFID chip to maintain a good transmission performance.

SUMMARY OF THE INVENTION

In view of the aforementioned shortcomings of the prior art, the inventor of the present invention based on years of experience in the related industry to conduct extensive researches and experiments, and finally developed a packing bag with a RFID function and invented its method, in hope of using the metal layer in the packing bag as the slot antenna of the RFID chip to overcome the problems of the conventional RFID tag.

Therefore, it is a primary objective of the present invention to provide a packing bag with a RFID function, and the packing bag comprises a bag body, two conductive films and a RFID chip, wherein the bag body comprises a metal layer (such as an aluminum foil), an insulating layer (such as polyethylene terephthalate, PET) and a laminated layer (such as polyethylene, PE or polypropylene, PP), and an external surface of the metal layer is covered onto an internal surface of the insulating layer, and an internal surface of the metal layer is covered onto an external surface of the laminated layer to seal (such as thermally seal) corresponding edges of the laminated layer to form the bag body, and an accommodating space is formed inside the bag body. The metal layer includes a first slot formed at a position proximate to an edge of the bag body, and the conformation of the first slot allows the metal layer to be used as a slot antenna. A second slot is formed between the two conductive films, and the second slot has a size capable for fixing the pins on two corresponding sides of the RFID chip onto the two conductive films respectively, and the two conductive films are used for increasing the coupling area of the pins on the two corresponding sides of the RFID chip, and the two conductive films are fixed on an external surface of the insulating layer and at a position corresponding to the first slot, such that the two conductive films can be coupled to two feed-in points of the slot antenna respectively, and the RFID chip can receive and transmit electromagnetic signals through the slot antenna (or the metal layer). Since the present invention uses the metal layer of the bag body as the slot antenna of the RFID chip, therefore manufacturers simply fix the RFID chip onto the external surface of the insulating layer and at a position corresponding to the first slot through the two conductive films to achieve the effect of using the metal layer as the slot antenna to receive and transmit the RFID signals, without the need of purchasing an additional RFID tag (including the RFID chip and the antenna). If the packing bag is used for packing a metal object, the metal layer can effectively suppress the image pulse of the metal object produced by the image theory, so that the distance of transmitting and receiving electromagnetic waves by the RFID chip will not be decreased significantly by the image pulse, and a good transmission performance of the RFID chip can be maintained.

Another objective of the present invention is to provide a manufacturing method of a packing bag with a RFID function, and the manufacturing method comprises the steps of covering an external surface of a metal layer onto an internal surface of an insulating layer, forming a first slot on the metal layer and at a position proximate to an edge of the metal layer, covering an internal surface of the metal layer onto an external surface of a laminated layer, and sealing corresponding edges of the laminated layer with one another to produce a bag body. Further, two pins of a RFID chip are fixed onto two conductive films respectively, and then the two conductive films are attached onto an external surface of the insulating layer and at a position corresponding to the first slot to produce a packing bag with a RFID function.

A further objective of the present invention is to provide a packaging bag further comprising a protective sticker covered onto the two conductive films to protect the RFID chip and the two conductive films and prevent the components from being damaged or falling apart due to collisions.

DETAILED DESCRIPTION OF THE PREFERRED EMBODIMENTS

Figure 1:
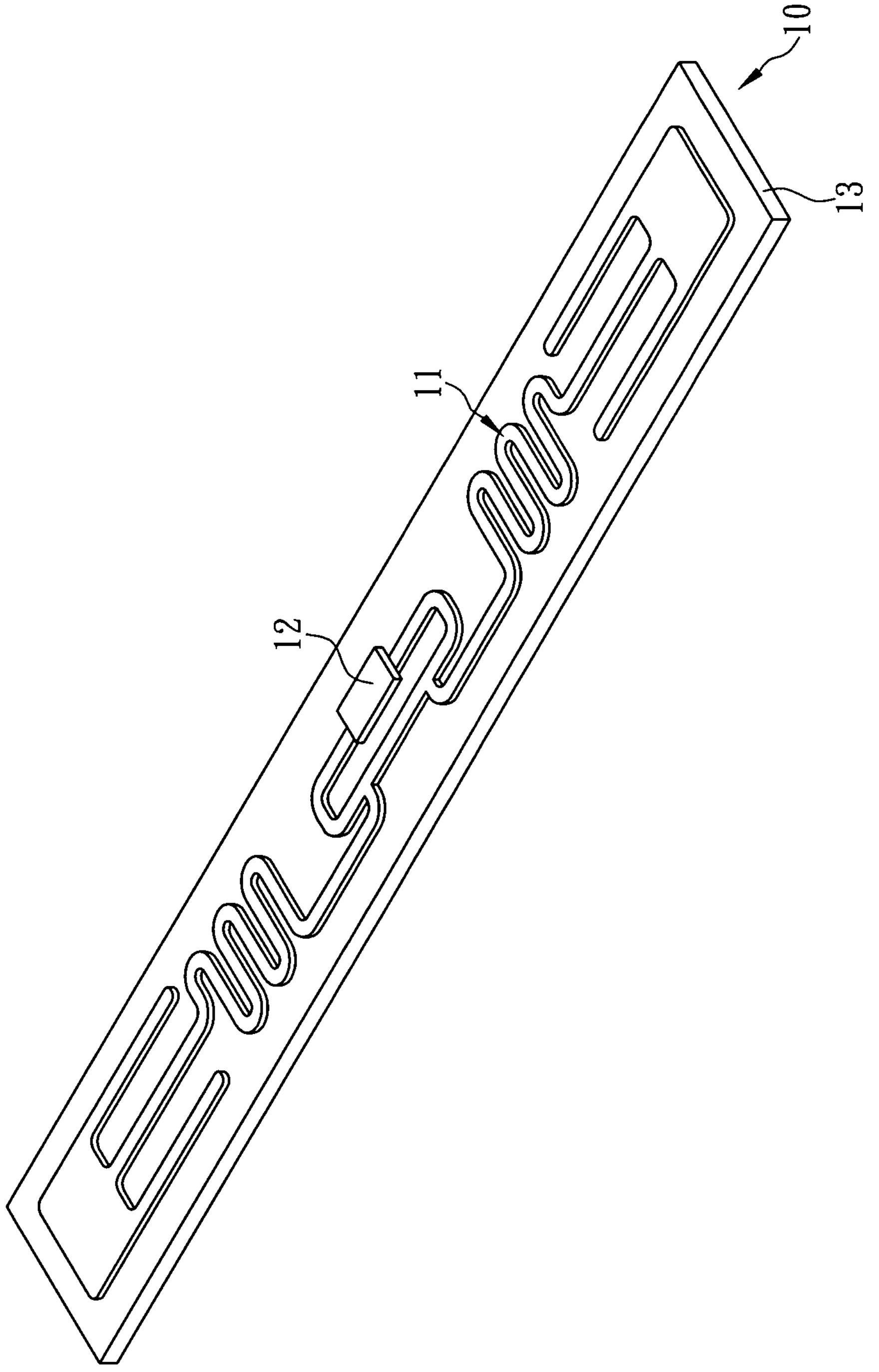
FIG. 1 (Prior Art)
FIG. 1 is a schematic view of a conventional RFID tag.
Figure 2:
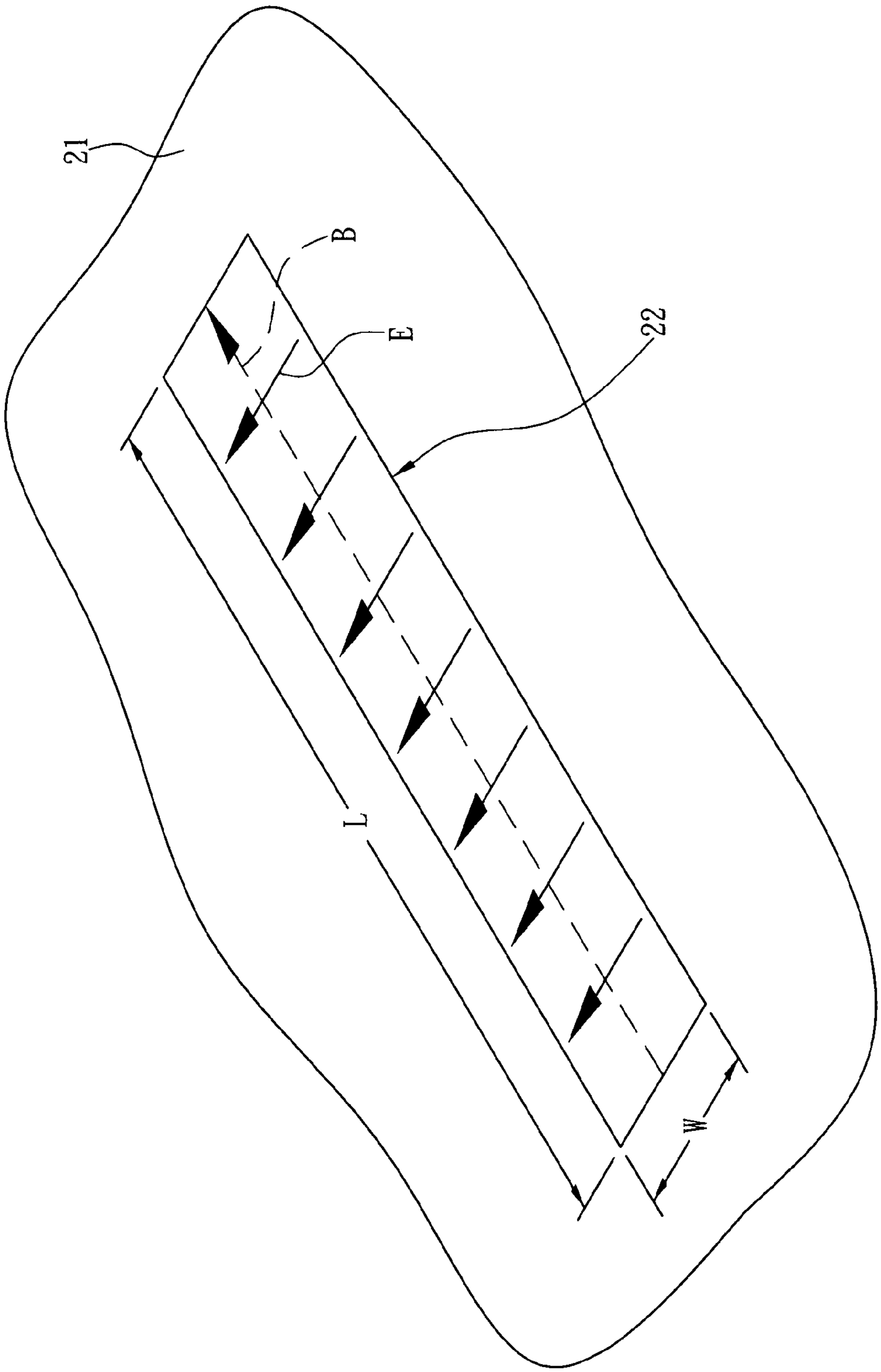
FIG. 2 is a schematic structural view, showing the principle of a slot antenna.

The present invention mainly adopts the principle of a slot antenna, and uses a metal layer inside a packing bag as an antenna of a RFID chip. With reference to FIG. 2 for the principle of the slot antenna, a slot 22 is formed on an infinitive flat conductor plate 21, and the slot 22 has a length L and a width W, and the length L is much greater than the width W. If a voltage difference is applied on both sides having a longer length, then an electric field E and a magnetic field B will be produced as shown in FIG. 2, such that the slot antenna can have the function of receiving and transmitting electromagnetic signals.

Figure 3:
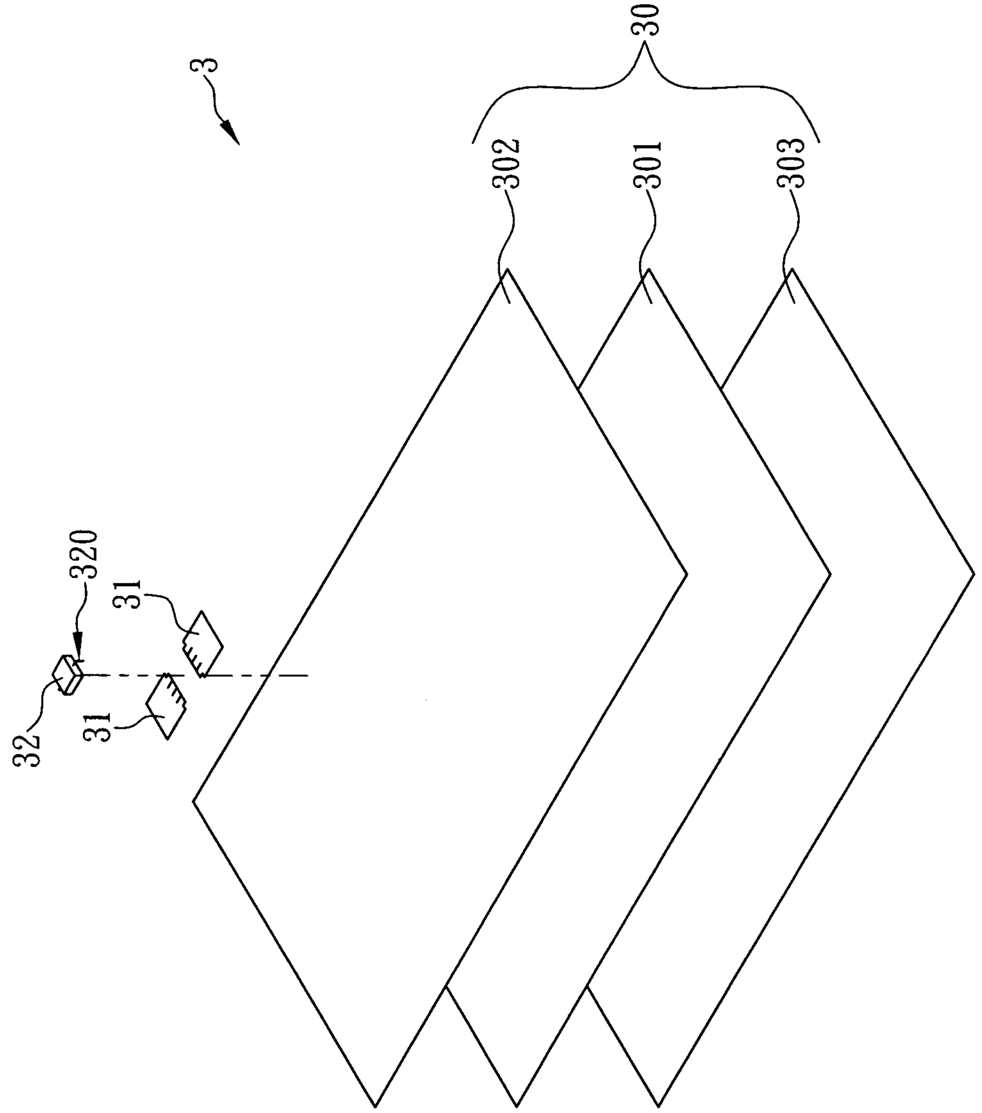
FIG. 3 is an exploded view of a preferred embodiment of the present invention.

The present invention uses the characteristics of the aforementioned slot antenna to change the structure of a general packing bag to design a packing bag with a RFID function. In a preferred embodiment of the present invention as shown in FIG. 3, the packing bag 3 comprises a bag body 30, two conductive films 31 and a RFID chip 32, wherein the RFID chip 32 is a chip of the general RFID tag. The bag body 30 includes a metal layer 301, an insulating layer 302 and a laminated layer 303. The metal layer 301 is an aluminum foil, and an external surface of the metal layer 301 is covered onto an internal surface of the insulating layer 302, wherein the insulating layer 302 is made of a polyethylene terephthalate (PET) based material, an ONY polyimide based material or an OPP polyolefin based material. These materials have excellent firmness, tensile strength, impact resistance, heat resistance, wear resistance, and electric conductivity, so that the insulating layer 302 can maintain excellent mechanical properties and insulation. An internal surface of the metal layer 301 is covered onto an external surface of the laminated layer 303, wherein the laminated layer 303 is a common polymeric material such as a CPE (Chlorinated Polyethylene) polyolefin based material or a CPP (Cast Polypropylene) OPP polyolefin based material, and these materials can resist various types of organic solvents, acids and alkalis.

Figure 4:
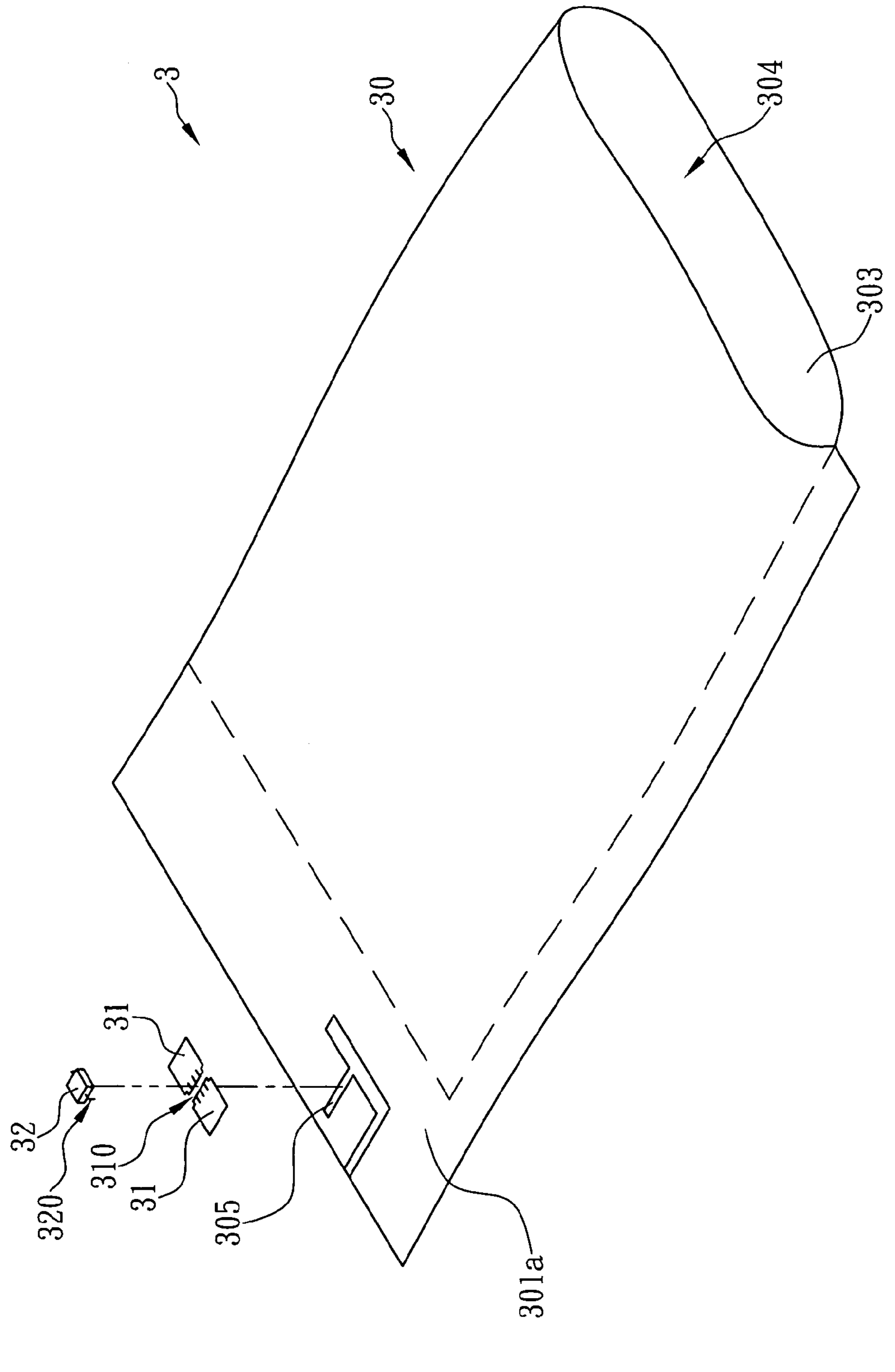
FIG. 4 is another exploded view of a preferred embodiment of the present invention.

In this preferred embodiment as shown in FIGS. 3 and 4, after corresponding edges of the laminated layer 303 are sealed with one another (such as by thermal sealing), the bag body 30 is formed, and an accommodating space 304 is formed in the bag body 30. The laminated layer 303 of this preferred embodiment is folded such that corresponding edges of the laminated layer 303 are superimposed, but the invention is not limited to such arrangement only. Manufacturers can also change the design by superimposing two laminated layers 303 and sealing corresponding edges of the two laminated layers 303 to form the bag body 30, and persons skilled in the art can think of a change or modification, and such equivalent change or modification is intended to be covered by the scope. In addition, the metal layer 301 includes a first slot 305 formed at a position proximate to an edge of the bag body 30, and the conformation of the first slot 305 allows the metal layer 301 to act as a slot antenna 301*a*, and complies with the design of the RFID chip 32. Since different RFID chips have different resistances, therefore a corresponding shape of the slot is required. The conformation of the first slot 305 as shown in FIG. 4 is an embodiment of the present invention only. It is noteworthy to point out that manufacturers are not limited to such arrangement for the actual production of the package bag of the present invention.

Figure 5:
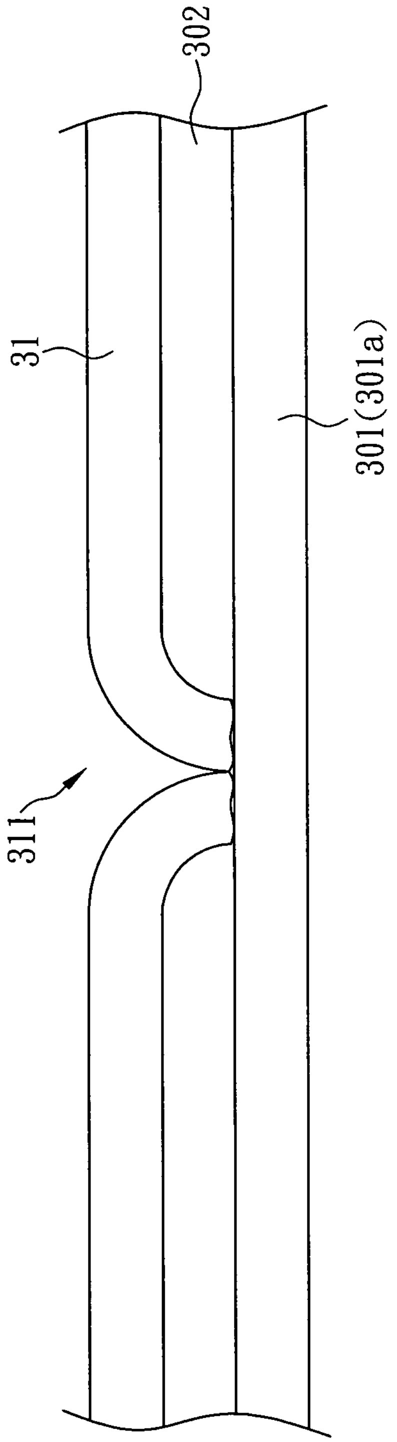
FIG. 5 is a schematic cross-sectional view of a hole formed by punching through a conductive film.

With reference to FIGS. 3 and 4, the two conductive films 31 have a size greater than the RFID chip 32, and a second slot 310 is formed between the two conductive films 31. Since pins 320 on two corresponding sides of the RFID chip 32 are fixed to the conductive film 31 respectively, therefore the size of the second slot 310 must be maintained appropriately. With the two conductive films 31, the coupling area of the two pins 320 of the RFID chip 32 and the metal layer 301 is increased. The so-called coupling area refers to an area for coupling two or more circuit components, and thus a tight connection and a mutual affection exist between the inputs and outputs of the circuit components, and energy can be transmit from one circuit component to the other. The two conductive films 31 are stuck and fixed onto an external surface of the insulating layer 302 and at a position corresponding to the first slot 305, so that the two conductive films 31 can be coupled to two feed-in points of the slot antenna 301*a* (or the metal layer 301) respectively. However, the present invention is not limited to such arrangement only. To assure the two conductive films 31 to be electrically coupled to the feed-in points of the slot antenna 301*a*, manufacturers can connect the two conductive films 31 with the feed-in points of the slot antenna 301*a* respectively by a punch-through method. With reference to FIG. 5, if each conductive film 31 is fixed onto the insulating layer 302 and punched to form a hole 311, such that a portion of the conductive film 31 proximate to the periphery of the hole 311 is contacted with the metal layer 301 (or the slot antenna 301*a*) due to an extension of a plastic deformation.

Figure 6:
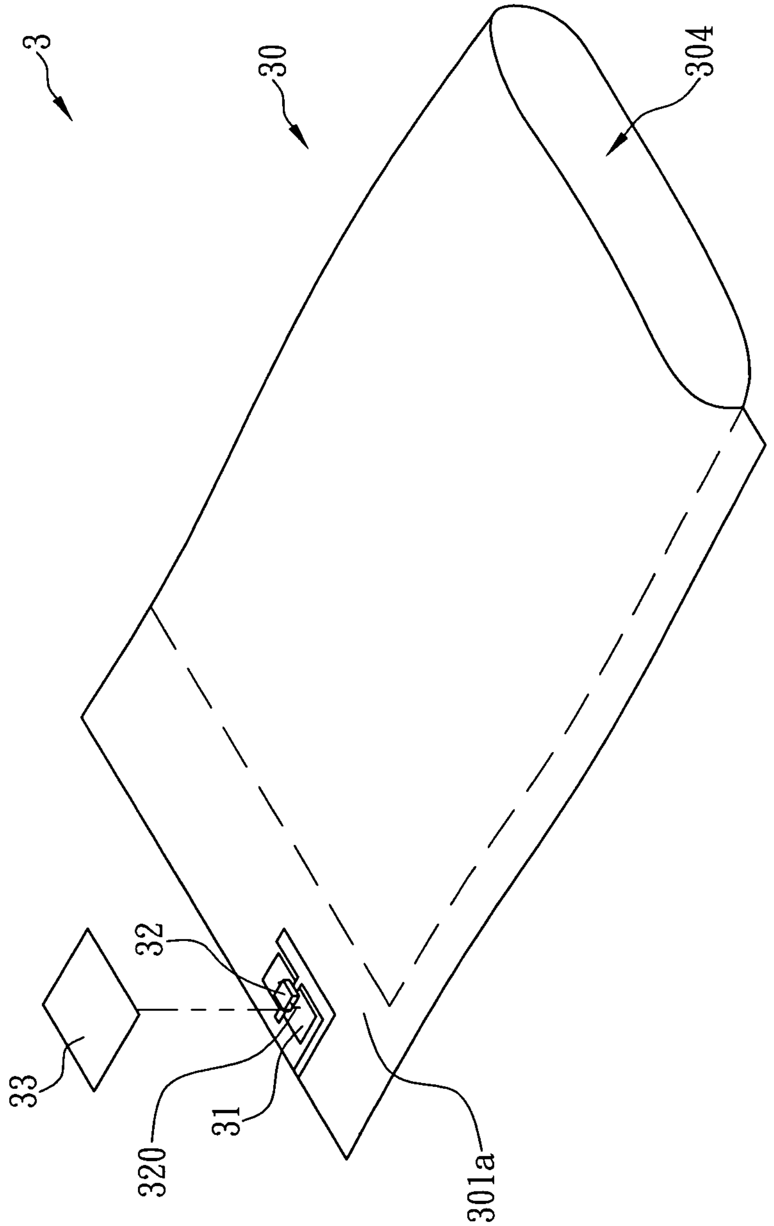
FIG. 6 is a schematic view of a preferred embodiment of the present invention.

In the preferred embodiment as shown in FIG. 4, after the two conductive films 31 are fixed onto the bag body 30, and the RFID chip 32 is fixed to the two conductive films 31, the RFID chip 32 as shown in FIG. 6 can receive or transmit electromagnetic signals through the slot antenna 301*a* (or the metal layer 301). The present invention uses the metal layer 301 as the slot antenna 301*a*, and thus the metal object will not have the image pulse problem. If the packing bag 3 is used for packing a metal object, the metal layer 301 can suppress the metal object from having the image impulse due to the image theory, so that the distance of transmitting or receiving electromagnetic waves by the RFID chip 32 will not be decreased significantly by the image pulse, and a good transmission performance can be maintained. Further, manufacturers simply fix the RFID chip 32 onto an external surface of the insulating layer 302 and at a position corresponding to the first slot 305 through the two conductive films 31 in order to use the metal layer 301 as the slot antenna 301*a*, without the need of purchasing an additional RFID tag (including the RFID chip and antenna). Therefore the present invention can achieve the effect of transmitting and receiving RFID signals while waiving the design of the conventional RFID tag and saving the material cost. In addition, the present invention also can reduce the area occupied by the RFID tag, not only providing a better appearance of the packing bag 3, but also preventing the RFID tag from being peeled off easily.

In the preferred embodiment as shown in FIG. 6, the packing bag 3 further comprises a protective sticker 33 for preventing the RFID chip 32 from being damaged or falling off due to collisions and protecting the two conductive films 31, wherein an internal side of the protective sticker 33 is attached onto one side of the two conductive films 31 with the RFID chip 32 installed thereon for covering the two conductive films 31 and the RFID chip 32 and protecting the RFID chip 32 and the two conductive films 31. Equivalently, manufacturers can install the RFID chip 32 onto the two conductive films 31 while the packing bag is being designed and manufactured, and then the protective sticker 33 is stuck onto the two conductive films 31, such that the manufacturers only need to stick the protective sticker 33 together with the two conductive films 31 onto the bag body 30 at a later manufacturing process to complete manufacturing the packing bag 3 and simplify the production flow effectively.

Figure 7:
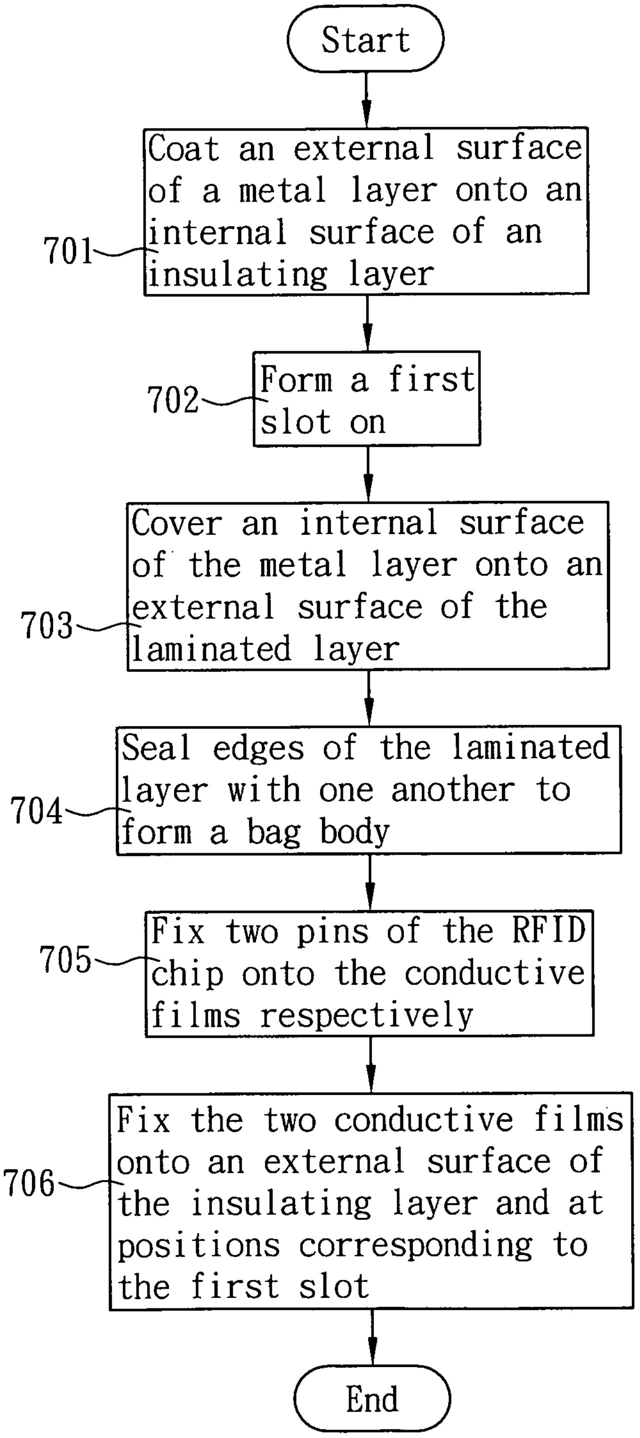
FIG. 7 is a flow chart of a manufacturing method of the present invention.

In addition to the structure of the aforementioned preferred embodiment, the manufacturing method of the packing bag 3 is described together with the related drawings. With reference to FIGS. 3, 4 and 7 for a packing bag 3 of the present invention, the packing bag 3 is manufactured by the following manufacturing procedure:

(701) Cover an external surface of the metal layer 301 onto an internal surface of the insulating layer 302;

(702) Form the first slot 305 at a position proximate to an edge of the metal layer 301 (by a chemical etching method);

(703) Cover an internal surface of the metal layer 301 onto an external surface of the laminated layer 303;

(704) Seal edges of the laminated layer 303 corresponding to the first slot 305 with one another to form the bag body 30;

(705) Fix two pins 320 of the RFID chip 32 onto the conductive films 31 respectively, and maintain a second slot 310 between the conductive films 31; and (706) Stick the two conductive films 31 onto an external surface of the insulating layer 302 and at positions corresponding to the first slot 305.

It is noteworthy to point out that manufacturers can form the metal layer 301 with the first slot 305 on the insulating layer 302 in the steps (701) and (702) by an evaporation method. Alternatively, the steps (701) to (703) are changed, wherein after the metal layer 301, the insulating layer 302 and the laminated layer 303 are combined, a punching method is used to form the first slot 305. If manufacturers want to cover the protective sticker 33 onto the two conductive films 31 in the foregoing procedure (as shown in FIG. 6), the manufacturers can choose to stick the protective sticker 33 after the step (706) takes place or after the step (705) takes place, such that the protective sticker 33 can be stuck onto the two conductive films 31 to protect the two conductive films 31 and the RFID chip 32. It is noteworthy to point out that persons skilled in the art can make modifications and changes to the aforementioned arrangement, and the equivalent modifications and changes are intended to be covered by the scope of the present invention.

Figure 8:
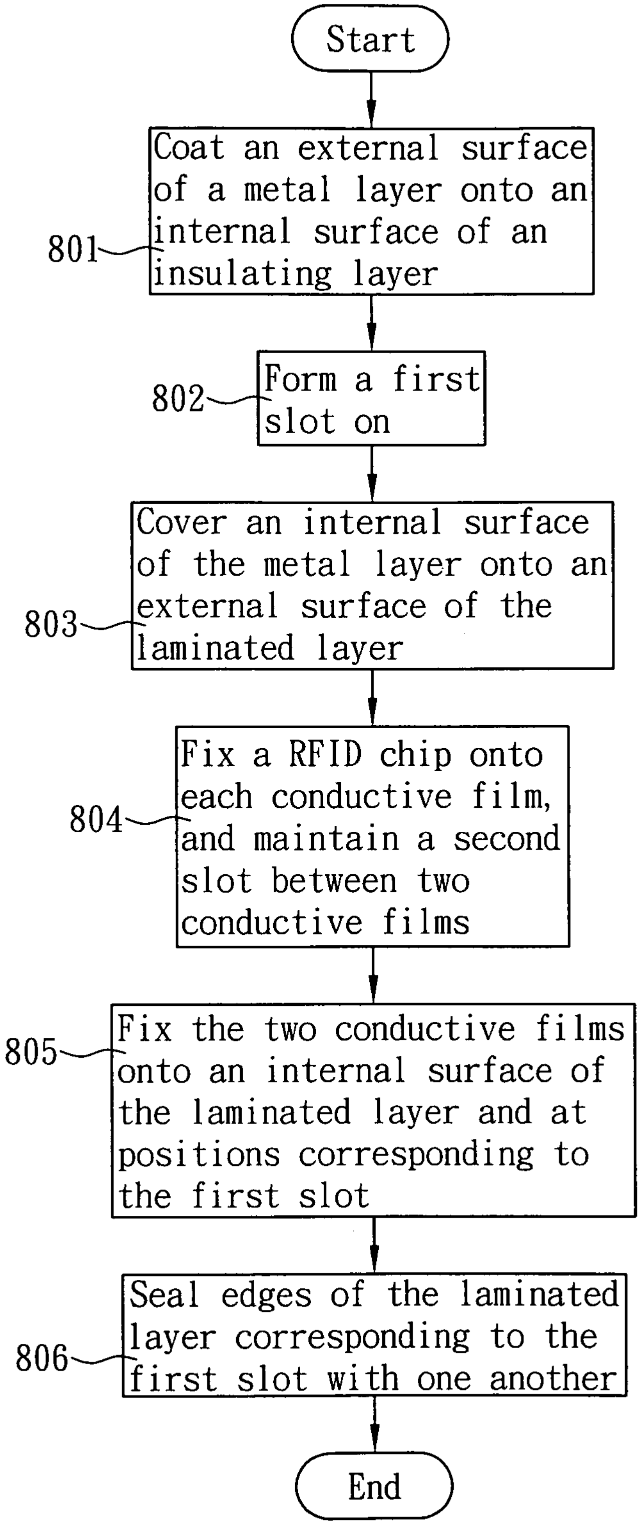
FIG. 8 is a flow chart of another manufacturing method of the present invention.

In the aforementioned preferred embodiment and manufacturing procedure, the two conductive films are fixed onto an external surface of the insulating layer, but the present invention is not limited to such arrangement only, and manufacturers can also adopt the following manufacturing procedure to fix the two conductive films and RFID chip onto the internal surface of the laminated layer. With reference to FIG. 8 for the flow chart of the manufacturing procedure of the present invention, the procedure comprises the steps of:

(801) covering an external surface of a metal layer onto an internal surface of an insulating layer;

(802) forming a first slot on the metal layer and at a position proximate to an edge of the metal layer;

(803) covering an internal surface of the metal layer onto an external surface of a laminated layer;

(804) fixing two pins of a RFID chip onto two conductive films respectively, and maintaining a second slot between the two conductive films;

(805) fixing the two conductive films (including the RFID chip) onto an internal surface of the laminated layer and at a position corresponding to the first slot; and (806) sealing edges of the laminated layer corresponding to the first slot with one another to form a bag body.

It is noteworthy to point out that manufacturers can also combine the RFID chip and the two conductive films first in the step (804) before the step (801) takes place, and persons skilled in the art can think of a modification or change of the present invention easily, and these equivalent medications and changes are intended to be covered by the scope of the present invention. With the aforementioned manufacturing procedure, the two conductive films and the RFID chip are sealed into the laminated layer, not only maximizing the RFID effect of the present invention, but also protecting the RFID chip from being damaged.

Figure 9:
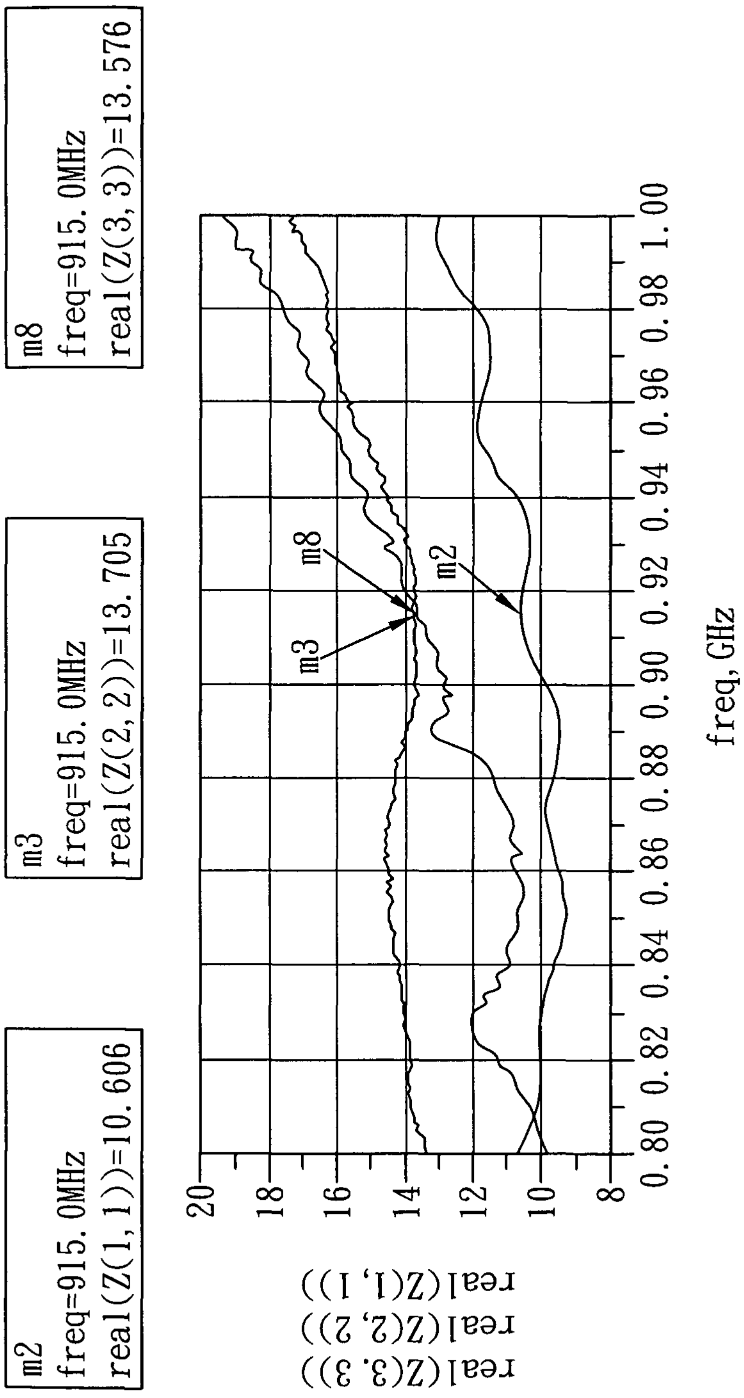
FIG. 9 is graph of real part of resistance versus frequency of a preferred embodiment of the present invention.
Figure 10:
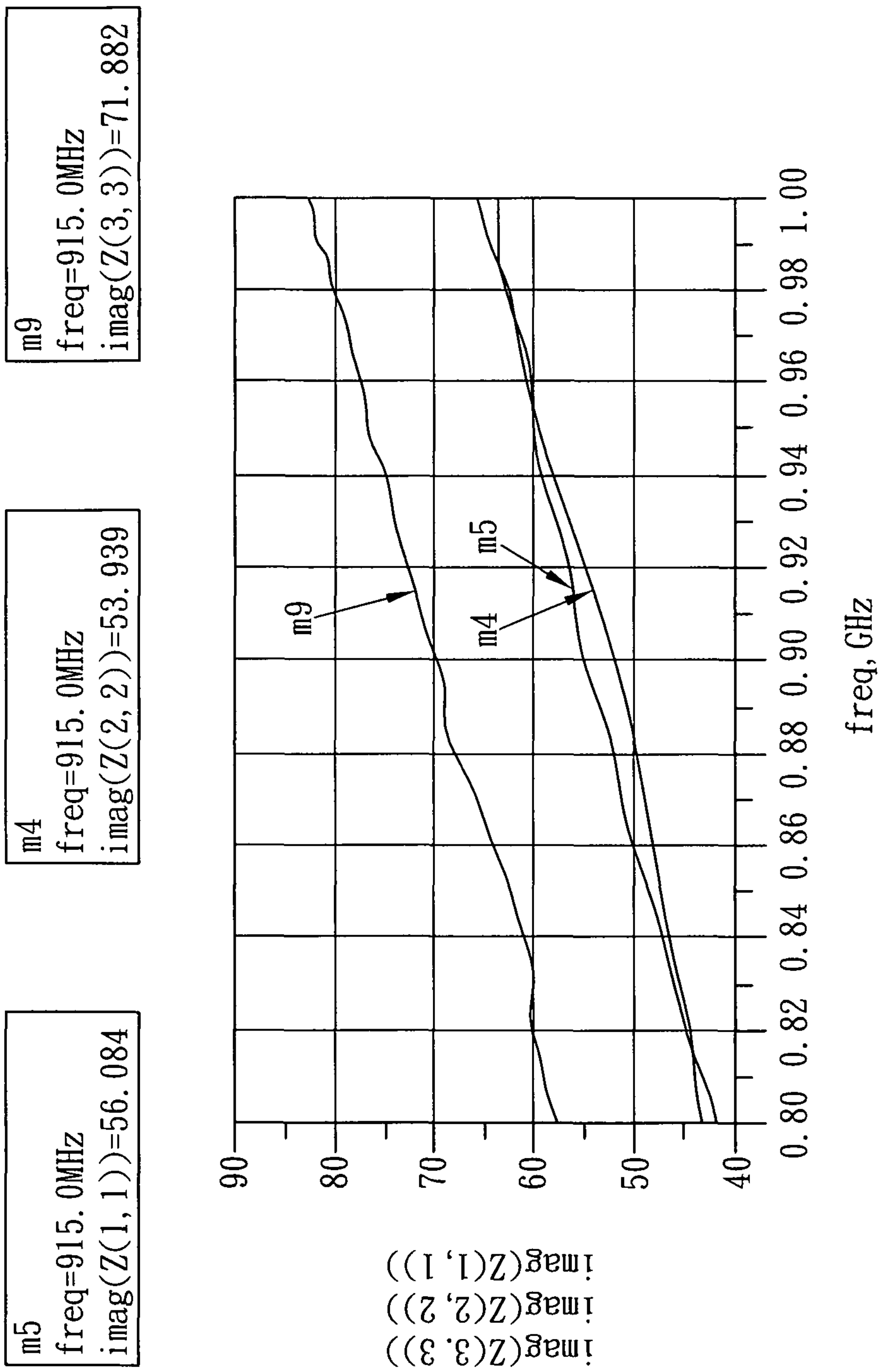
FIG. 10 is a graph of imaginary part of resistance versus frequency of a preferred embodiment of the present invention.
Figure 11:
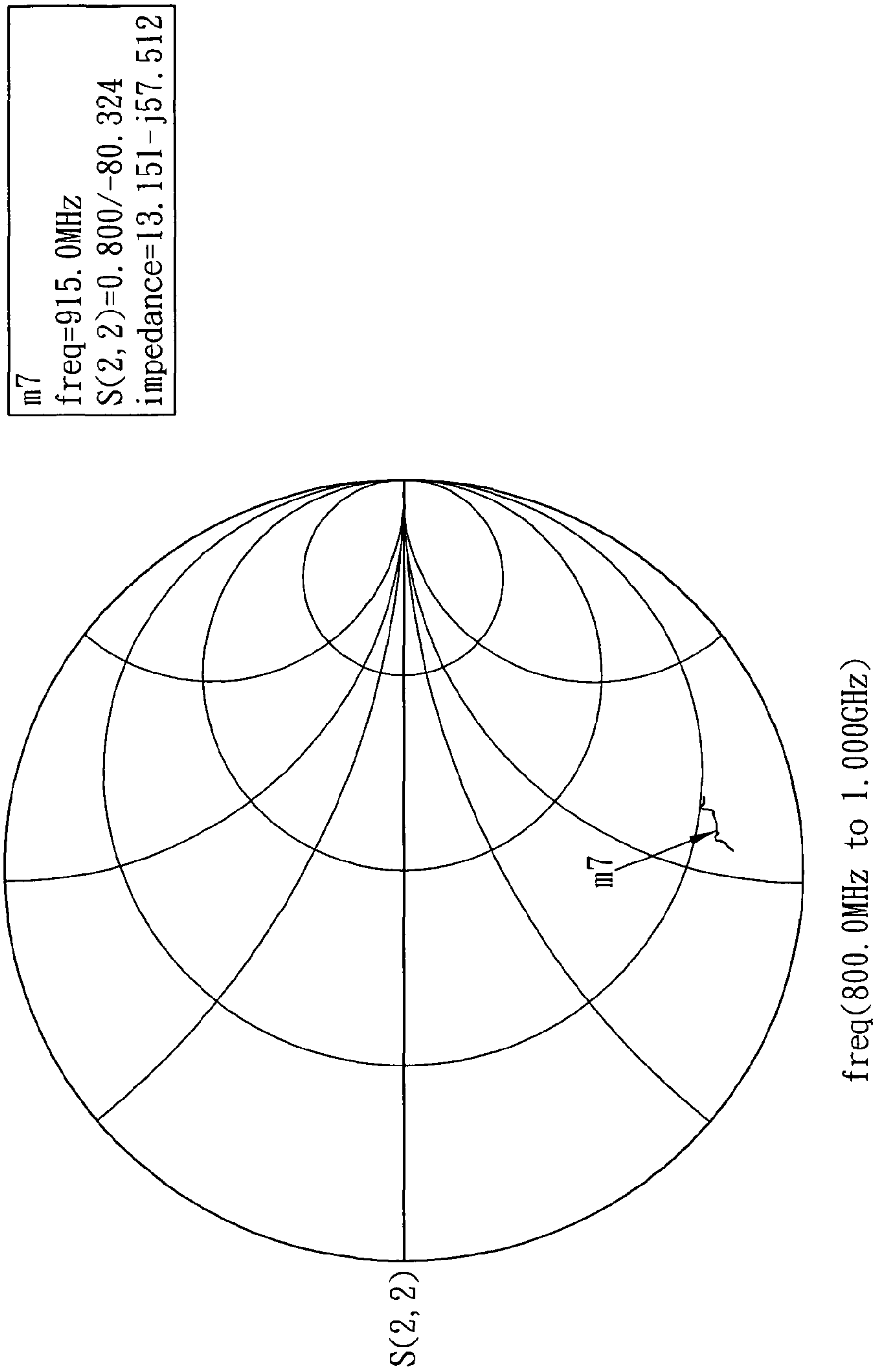
FIG. 11 is a Smith chart of a preferred embodiment of the present invention.

In summation of the description above, the present invention can waive the design of a conventional RFID antenna and reduce the manufacturing cost. In an actual test on the properties of the antenna of the packing bag of the present invention conducted by the inventor, the real part of a resistance, the imaginary part of a resistance and the Smith chart as shown in FIGS. 9, 10 and 11 respectively indicate that the packing bag has a maximum distance of two meters for transmitting electromagnetic signals, and this distance is much greater than the distance of the conventional packing bag having the RFID tag attached onto a metal object (and such distance approaches zero meter). Obviously, the present invention is a feasible solution for the problems of the prior art.

While the invention herein disclosed has been described by means of specific embodiments, numerous modifications and variations could be made thereto by those skilled in the art without departing from the scope of the invention set forth in the claims.

What is claimed is:

1. A packing bag with a RFID function, comprising:

a bag body, comprising a metal layer, an insulating layer and a laminated layer; wherein an external surface of the metal layer is attached to an internal surface of the insulating layer, an internal surface of the metal layer is attached to an external surface of the laminated layer, corresponding edges of an internal surface of the laminated layer are sealed with one another to form the bag body, an accommodating space is defined in the bag body, a first slot is formed on the metal layer and at a position proximate to an edge of the bag body, and the first slot has a conformation for using the metal layer as a slot antenna;

two conductive films, being separated by a second slot; wherein the two conductive films are attached to an external surface of the insulating layer and at positions that the second slot corresponds to the first slot and the two conductive films are coupled to two feed-in points of the slot antenna respectively; and a RFID chip, with a size smaller than each of the conductive films, and having pins disposed on two corresponding sides of the RFID chip and fixed onto the two conductive films respectively.

2. The packing bag of claim 1, wherein when each of the conductive films is attached to the insulating layer, each of the conductive films is punched through to form a hole, such that a portion of the conductive film proximate to the periphery of the hole is contacted with the metal layer due to an extension of a plastic deformation such that the two conductive films are electrically coupled to the two feed-in points of the slot antenna respectively.

3. The packing bag of claim 2, further comprising a protective sticker with an internal side attached onto a side of the RFID chip which is installed on the two conductive films.

4. The packing bag of claim 3, wherein the metal layer is an aluminum foil.

5. The packing bag of claim 4, wherein the insulating layer is made of a PET polyethylene terephthalate based material, an ONY polyamide based material or an OPP polyolefin based material.

6. The packing bag of claim 5, wherein the laminated layer is made of a CPE polyolefin based material or a CPP polyolefin based material.

7. The packing bag of claim 1, further comprising a protective sticker with an internal side attached onto a side of the RFID chip which is installed on the two conductive films.

8. The packing bag of claim 7, wherein the metal layer is an aluminum foil.

9. The packing bag of claim 8, wherein the insulating layer is made of a PET polyethylene terephthalate based material, an ONY polyamide based material or an OPP polyolefin based material.

10. The packing bag of claim 9, wherein the laminated layer is made of a CPE polyolefin based material or a CPP polyolefin based material.

11. A packing bag with a RFID function, comprising:

a bag body, comprising a metal layer, an insulating layer and a laminated layer; wherein an external surface of the metal layer is attached to an internal surface of the insulating layer, an internal surface of the metal layer is attached to an external surface of the laminated layer, a first slot is formed on the metal layer and at a position proximate to an edge of the bag body, and the first slot has a conformation for using the metal layer as a slot antenna;

two conductive films, being separated by a second slot, and a RFID chip, with a size smaller than each of the conductive films, and having pins disposed on two corresponding sides of the RFID chip and fixed onto the two conductive films respectively; wherein the two conductive films are attached to an internal surface of the laminated layer and at positions that the second slot corresponds to the first slot and the two conductive films are coupled to two feed-in points of the slot antenna respectively, corresponding edges of the internal surface of the laminated layer are sealed with one another to form the bag body, and an accommodating space is formed in the bag body.

12. The packing bag of claim 11, wherein the metal layer is an aluminum foil.

13. The packing bag of claim 12, wherein the insulating layer is made of a PET polyethylene terephthalate based material, an ONY polyamide based material or an OPP polyolefin material.

14. The packing bag of claim 13, wherein the laminated layer is made of a CPE polyolefin based material or a CPP polyolefin based material.

15. A manufacturing method of a packing bag with a RFID function, comprising the steps of:

attaching an external surface of a metal layer to an internal surface of an insulating layer, and forming a first slot on the metal layer and at a position proximate to an edge of the metal layer;

attaching an internal surface of the metal layer to an external surface of a laminated layer;

sealing edges of an internal surface of the laminated layer corresponding to the first slot to form a bag body;

fixing two pins of a RFID chip onto two conductive films respectively; wherein each of the conductive film has a size greater than the RFID chip, and the two conductive films are separated by a second slot; and attaching the two conductive films to an external surface of the insulating layer and at positions that the second slot corresponds to the first slot and the two conductive films are coupled to two feed-in points of the slot antenna respectively.

16. The manufacturing method of claim 15, further comprising the step of:

punching through the conductive film to produce at least one hole, such that a portion of the conductive film proximate to the periphery of the hole is contacted with the metal layer due to an extension of a plastic deformation such that the two conductive films are electrically coupled to the two feed-in points of the slot antenna respectively.

17. The manufacturing method of claim 16, further comprising the step of:

attaching an internal side of a protective sticker onto a side of the two conductive films having the RFID chip installed thereon.

18. The manufacturing method of claim 15, further comprising the step of:

attaching an internal side of a protective sticker onto a side of the two conductive films having the RFID chip installed thereon.

19. A manufacturing method of a packing bag with a RFID function, comprising the steps of:

attaching an external surface of a metal layer to an internal surface of an insulating layer, and forming a first slot on the metal layer and at a position proximate to an edge of the metal layer;

attaching an internal surface of the metal layer to an external surface of a laminated layer;

fixing two pins of a RFID chip onto two conductive films respectively; wherein each of the conductive film has a size greater than the RFID chip, and the two conductive films are separated by a second slot;

attaching the two conductive films to an internal surface of the laminated layer and at positions that the second slot corresponds to the first slot and the two conductive films are coupled to two feed-in points of the slot antenna respectively; and sealing edges of the internal surface of the laminated layer corresponding to the first slot with one another.

* * * * *